United States Patent [19]

Blanchard et al.

[11] Patent Number: 5,757,892
[45] Date of Patent: May 26, 1998

[54] SELF-CONTAINED FAX COMMUNICATIONS APPLIANCE

[75] Inventors: Kenneth E. Blanchard, Media; Robert J. Douglass, Kennett Square, both of Pa.

[73] Assignee: Phonetics, Inc., Aston, Pa.

[21] Appl. No.: 540,645

[22] Filed: Oct. 11, 1995

[51] Int. Cl.$^6$ .................................................. H04M 11/00
[52] U.S. Cl. ............................ 379/93.26; 379/100.01; 379/100.13
[58] Field of Search ........................ 379/90, 93, 96, 379/98, 100, 90.01, 93.01, 93.26, 93.27, 93.28, 106.01, 106.03, 106.11, 100.01, 100.09, 100.13, 106; 375/222; 358/402, 442

[56] References Cited

U.S. PATENT DOCUMENTS

| | | | |
|---|---|---|---|
| 4,914,688 | 4/1990 | Kobayashi | 379/93 |
| 5,061,916 | 10/1991 | French et al. | 358/442 |
| 5,225,997 | 7/1993 | Lederer et al. | 379/106 |
| 5,247,575 | 9/1993 | Sprague et al. | 379/93 |
| 5,335,267 | 8/1994 | Evers et al. | |
| 5,452,106 | 9/1995 | Perkins | 379/100 |
| 5,557,752 | 9/1996 | Remion | 379/93 |
| 5,608,546 | 3/1997 | Nakamura et al. | 379/100 |

OTHER PUBLICATIONS

Brochure entitled "Argus Programmable Modem" published by Vidicode Data-communications of the Netherlands.

Primary Examiner—Curtis A. Kuntz
Assistant Examiner—Stephen W. Palan
Attorney, Agent, or Firm—Vickers, Daniels & Young

[57] ABSTRACT

A communications appliance which accepts ASCII character based input and creates fax machine compatible output for transmission over phone lines. The appliance mimics the responses of a modem to provide text-to-fax conversion or provides fax reports based on input from devices not otherwise capable of communicating in the fax mode.

13 Claims, 5 Drawing Sheets

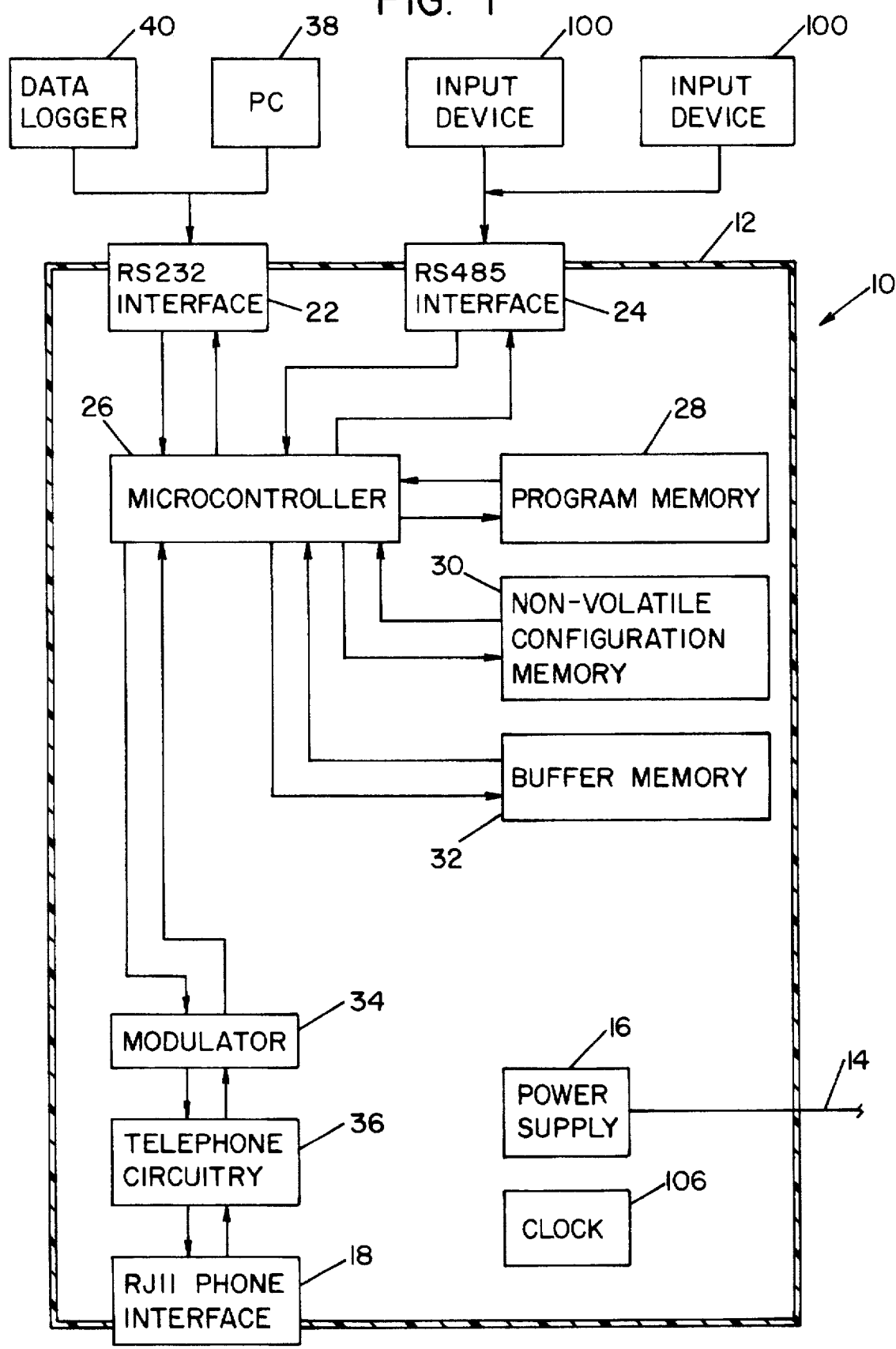

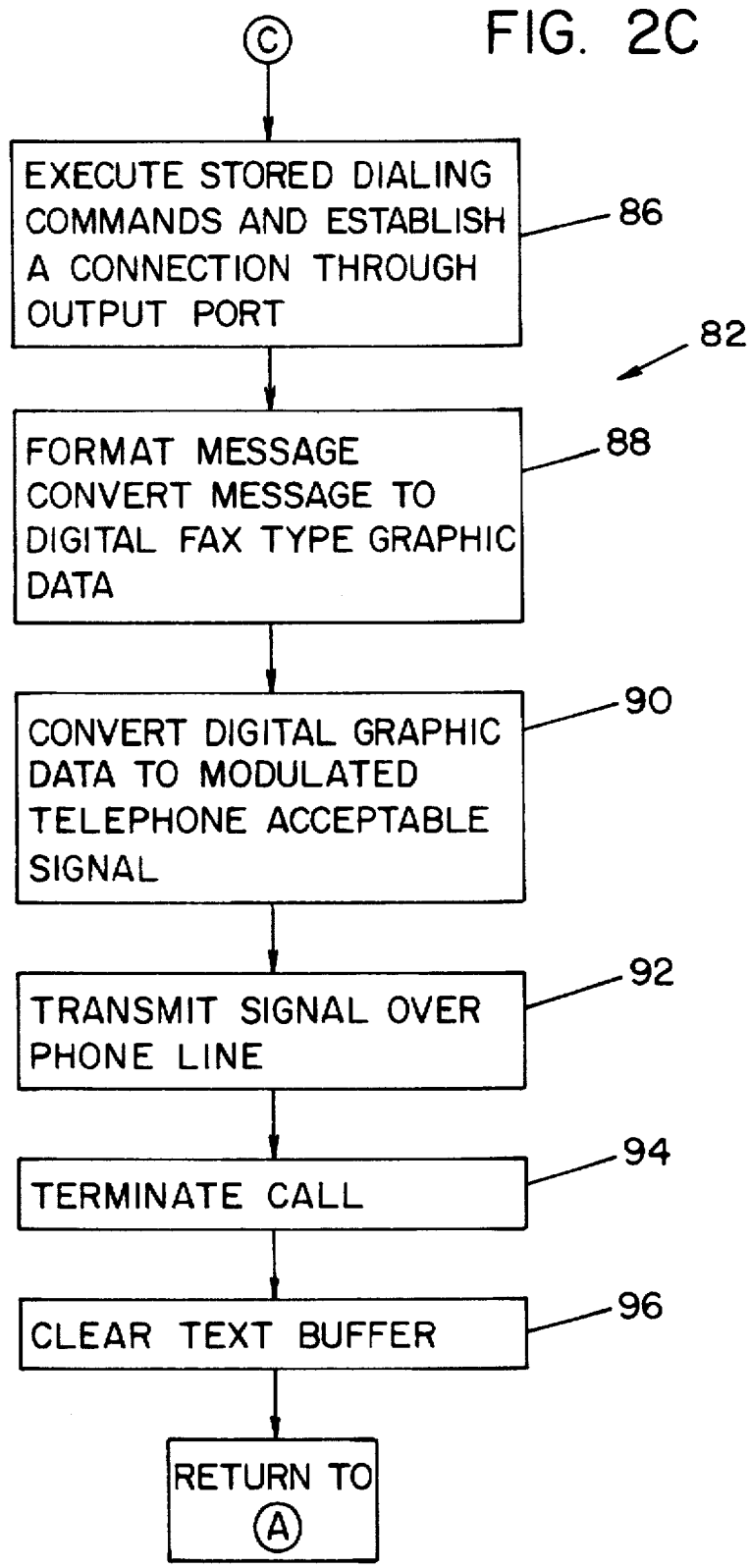

SELF-CONTAINED FAX COMMUNICATIONS APPLIANCE

FIELD OF THE INVENTION

This invention relates to the art of facsimile communications and more particularly to self-contained fax communications appliance not using a scanner.

BACKGROUND OF THE INVENTION

Computers frequently communicate with one another over telephone wires by means of modems. One computer can send simple text based information, graphical information or binary files to another computer by establishing an appropriate protocol and telephone connection with the second computer and sending the information. People use computers to send messages, download program files, establish real time chat links and for many other purposes. People also communicate with one another over the telephone line by means of fax machines. As is well known, a fax machine scans an image on a piece of paper and transmits a data string over the phone line which represents the image on the piece of paper. Fax machines have various vertical scanning resolution. One hundred and two hundred lines per inch are two available resolutions. In these resolutions, the image is scanned 100 or 200 times per inch and the lines transmitted for printing onto a piece of paper at the other end.

The above-described communications methods have several similarities but also several differences. One could not take a standard character-based word processor representation of a document, send it to a fax machine by modem and have the fax machine print out the document. The character-based information is formatted in a way the fax machine does not understand. This incompatibility was addressed with fax modems. A fax modem can be an external device connected to a serial port of a computer or an expansion card connected to a bus inside the computer. A fax modem can operate as a modem accepting data from other portions of the computer and sending it over the phone lines in a format acceptable to another modem for receipt as a text, graphics or binary file. Alternatively, the fax modem receives fax information from the rest of the computer and forwards that information in a protocol appropriate for receipt by a standard fax machine. A difficulty with these devices is that they require the computer to convert information to fax format internally. Thus, in a personal computer, such as one using an Intel microprocessor, the microprocessor must execute software converting a text-based message or graphics-base message into fax format and provide this converted stream of information to the fax modem for transmission as a fax. This is often a foreground operation. The computer user must wait for the fax conversion and transmission to be completed before he can again use the computer for other tasks. This differs from printing a document or sending a file over a modem which are often handled in the background with low microprocessor overhead.

This difficulty has been previously recognized. "Coprocessed" fax modems have been available. However, these coprocessed fax modems are internal expansion boards requiring installation inside the computer. Moreover, they do not completely overcome the problem. They are "coprocessors" which take some of the computational load off the main microprocessor but still require the execution of fax software by the main microprocessor and the coprocessor. They also consume memory as they require a driver to be resident in main memory at all times. Such expansion boards have been offered by Intel Corporation of Hillsboro, Ore., and identified as the Intel Satisfaxtion Modem 200 and Modem 400.

Such coprocessed fax modems cannot be used with other data generating devices such as data loggers and chart recorders.

SUMMARY OF THE INVENTION

The present invention contemplates a self-contained fax communications appliance receiving character-based digital signals conforming to a known standard such as the ASCII standard and character-based control signals conforming to a known standard such as the AT Command Set and converting the character-based information into dialing command for the telephone system and a fax signal conforming to known facsimile standards for transmitting the character-based information as a facsimile transmission.

Further in accordance with the invention, the communications appliance performs character-to-fax conversion without the intervention of the microprocessor in the main computer if one is present.

Yet further in accordance with the invention, the appliance is provided with a text buffer memory accumulating character-based information until sufficient information is present to electronically "scan" the information and create a fax signal representing such information.

Still further in accordance with the invention, program memory is provided and configuration memory is provided whereby character-based information is accumulated and manipulated to economically convert only complete pages, format text-based information into a report of selected configuration, provided alarm description in response to shorthand signals received over the appliance input, and otherwise provided written document communication by fax economically without the need of the intervention of the main microprocessor of the computer.

Still further in accordance with the invention, the appliance is provided with a polling instruction set allowing the appliance to interrogate devices connected to its input eliciting reports and alarm information.

Still further in accordance with the invention, the appliance is provided with a standard RS232 serial interface allowing character-based signal communication with a wide variety of input devices including microprocessors, telephone system controllers and various sensor arrays.

Yet further in accordance with the invention, the appliance is provided with a RS485 input part capable of communicating with multiple signal sources.

Still further in accordance with the invention, the appliance is provided with a modulator/demodulator chip set adapted to create output signals compatible with standard modem communications and with standard fax communications selectively.

Still further in accordance with the invention, all of the above features are provided in a self-contained small appliance having an RS232 serial interface, an RS485 serial interface, and an RJ11 standard telephone interface receptacle, a power cord and no other connections.

It is the principal object of the present invention to provide a self-contained communications appliance accepted character-based output signals from a data logger, chart recorder, personal computer or the like and creating fax compatible output signals for communication to the telephone network without the intervention of the main microprocessor of the personal computer.

It is another object of the present invention to provide background faxing for a personal computer which does not consume a large number of cycles of the main microprocessor in performing fax conversion.

It still another object of the present invention to provide a communications appliance which accepts modem data communications from the serial port of a personal computer, converts that information into fax format, sends the information as a fax, and mimics the responses of a data modem whereby the main computer can send a fax by performing the steps normally associated with a background modem file transfer.

It is yet another object of the present invention to provide a communication appliance which can poll RS232 compatible device or RS485 compatible devices, elicit reports or alarm condition indicators and format a written report for fax transmission describing such reports or alarm conditions.

It is yet another object of the present invention to provide a self-contained fax communications appliance which can poll RS232 or RS485 compliant devices and automatically provide written reports periodically by facsimile over the phone lines.

These and other objects and advantages of the present invention will become apparent from the following description taken together with the drawings which forms a part hereof.

BRIEF DESCRIPTION OF THE DRAWING

FIG. 1 is a schematic diagram showing the preferred embodiment of the present invention in block format.

PREFERRED EMBODIMENT

Figure 2A:
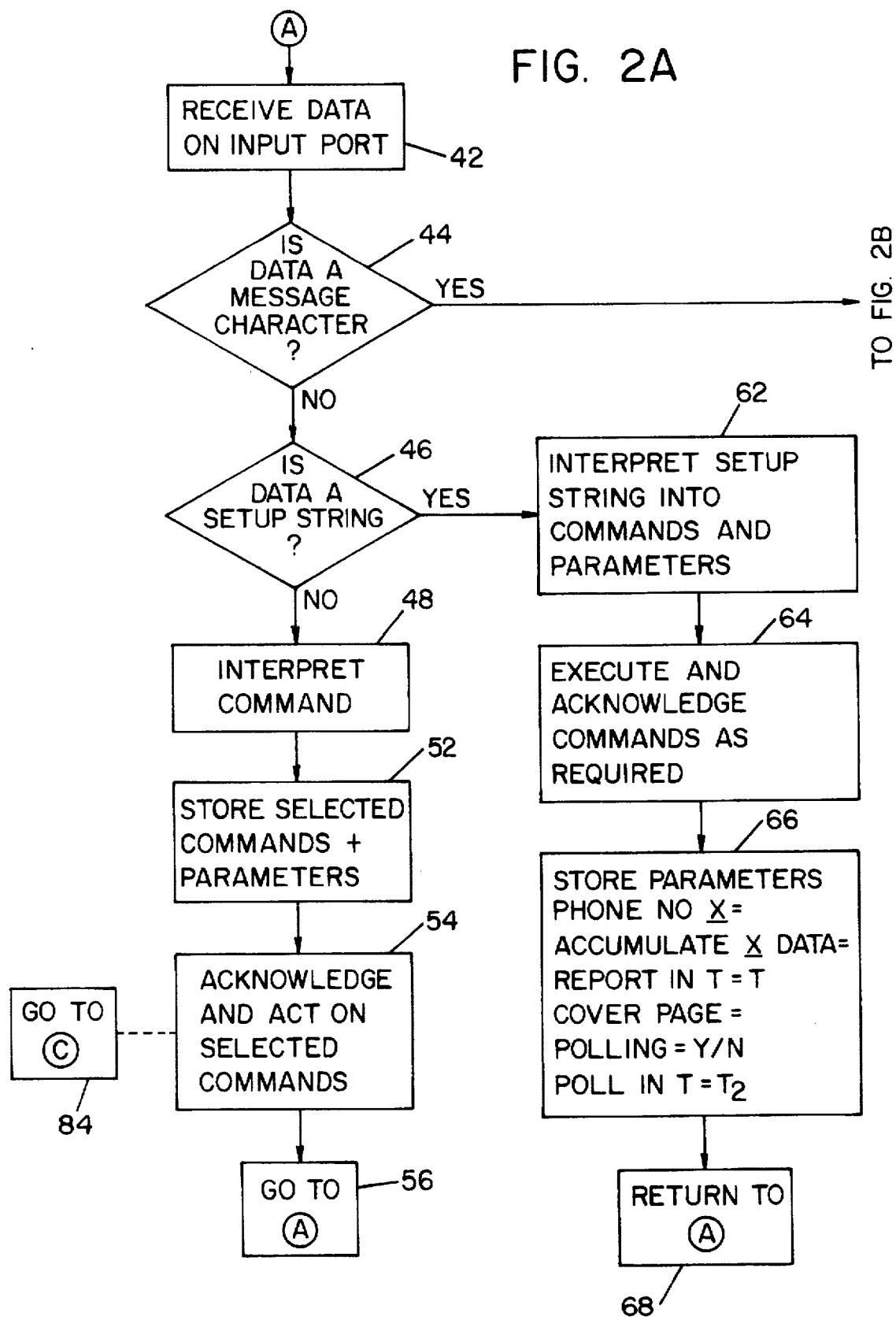
FIG. 2 is a block diagram showing the operation of the appliance of FIG. 1 in the data to fax mode.

Referring now to the drawings wherein the showings are for the purposes of illustrating a preferred embodiment of the invention only and not for the purpose of limiting the same, FIG. 1 shows the communications appliance 10 of the present invention. The entire appliance is contained in a small plastic housing 12 shown schematically having only four openings and two switches. Each of the openings is easily recognizable as it is a standard electronics interface or connection. A power cord 14 provides current to a power supply 16 within the housing. The power cord 14 can be connected to a conventional "brick" providing 12 volt DC current by means of a transformer plugged into a standard wall outlet. Alternatively, the transformer can be within the housing and the power cord terminated in a standard 2-pronged plug. The power supply is conventional.

One RJ11 phone interface 18 also presents an opening in the housing. The opening is the standard modular telephone jack allowing connection of the communications appliance 10 to a standard telephone network. Two input connectors are provided. The first is an RS232 interface 22 and the second is an RS485 interface 24. The RS232 interface 22 presents a standard serial receptacle in the housing 12. Similarly, the RS485 interface 24 presents a standard receptacle in the housing 12. An "on/off" power switch (not shown) and a "DTE/DCE" serial direction switch (not shown) are also provided. The DTE/DCE switch is used to configure the RS232 interface as a DTE device or a DCE device as in conventional. Thus, the appliance housing 12 is completely closed except for six standardized items, two input interfaces 22 and 24, a single output interface 18, two switches and a power supply cord 14. The housing 12 is otherwise completely closed and sealed. A lightweight, environmentally secure, and reliable appliance is thereby provided.

The RS232 interface 22 provides data to a microcontroller 26. A program memory 28, non-volatile configuration memory 30 and a buffer memory 32 are also contained within the housing 12. The various memory units 28, 30, 32, interact with the microcontroller 26 in processing information received over the RS232 interface 22 and/or the RS485 interface 24. The microcontroller 26 provides data to a modulator 34 which is in turn connected to telephone circuitry 36. The modulator 34 and telephone circuitry 36 together convert graphic fax type digital signals into signal which can be transmitted over phone lines in a conventional manner.

OPERATION

The above identified structures interact in a number of novel ways to provide several different modes of communications.

Figure 2B:
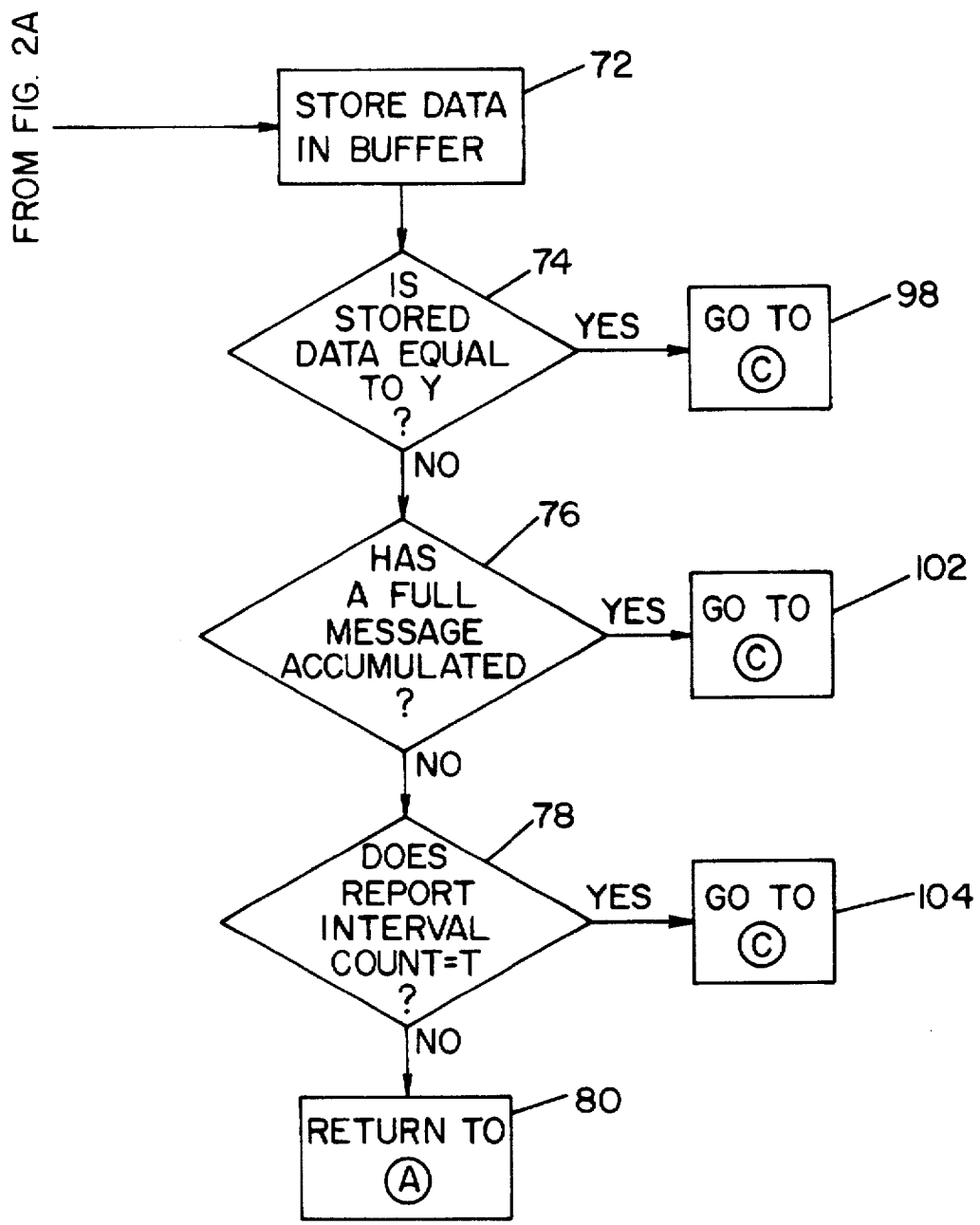

The text-to-fax modem - manual operation mode is illustrated in FIG. 2. This mode of operation is important when the appliance 10 is connected to a data logger, chart recorder or the like through a serial port. A data logger 40 is shown in the drawing (FIG. 1). Any device capable of creating ASCII data and AT commands can be used. The data logger 40 uploads a text file or report to the serial port. The data logger 40 sends a file as if it was sending a file to a modem. The data logger uses the standard "AT" command set to issue commands to the modem and standard ASCII representations of text to be sent. The data logger 40 sends the output signal through its serial port over serial cables to the RS232 interface 22 in FIG. 1. The microcontroller 26 notes activity at the input port 22 in the receive data on input port step 42. The microcontroller 26 performs this function through an interrupt recognition or polling. The data is taken from the RS232 interface 22 into the microcontroller 26 which then determines if the data is a message ASCII character in character-decision step 44. If the data is not a message character, the microcontroller 26 then determines if the data is a setup string character in setup-decision step 46. If the data is not a setup string character, the microcontroller 26 treats the data as a command and interprets the command in the command-interpretation step 48.

In this mode, data received on the RS232 interface 22 can only be message characters, setup strings or commands. Anything else would be an error and would be treated by the microcontroller 26 as an erroneous AT command and dealt with accordingly.

Commands are interpreted and then acted on by the microcontroller 26. Some commands are stored for later action in command-storage step 52 while other commands are acted upon immediately. For instance, a dialing command "ATDT (phone number)" results in the microcontroller 26 storing the telephone number to be called and then moving to acknowledgement step 54 wherein the microcontroller 26 tells the communicating data logger 40 that it has in fact dialed the number and has established the communications link. Thus, the communicating data logger 40 is told that it is uploading a file and to start transmitting data. The appliance 10 returns to start in step 56. The starting position of the sequence is identified by the capital letter A in a circle. An additional data word is then received in the received data step 42 and the process starts again.

When the data received in step 42 is a setup string, a different answer is generated in the setup-decision step 46 and different steps pursued. By "setup string" it is meant a setup string specifically for the appliance 10 as opposed to a setup string generated by the data logger 40 directed to the modem that the data logger thinks it is communicating with. Setup strings directed to the modem will be interpreted as commands and either acted upon or discarded depending upon their nature. Setup strings directed to the appliance 10 will be isolated in the setup-decision step 46 and interpreted as setup strings in setup-interpretation step 62. The setup strings normally contain commands to configure the appliance 10 and parameters on how the appliance 10 is to communicate with the outside world and receive data. These elements are distinguished, acted upon, and acknowledged in the execute-setup step 64. Parameters are stored as required in the store-parameter step 66. Parameters can include phone numbers to be dialed under special circumstances, the amount of data to be accumulated before converting into a fax, formatting text information for cover pages, polling directions, interval report timing, and polling intervals. Following the storage of parameters, the microcontroller returns to the start of this sequence in a return to start step 68. Setup strings may be sent while the appliance is connected to a personal computer 38 rather than the data logger 40 for ease of setup.

If the data received in step 42 is a data message character such as a letter "m", it is isolated in character-decision step 44 and stored in the buffer memory 32 in the store data in buffer step 72. A series of tests are then performed which are not generally applicable to the text-to-fax modem manual operation procedure. First, the amount of text data stored will be compared to a parameter Y normally set in the initial setup step. This comparison is done in capacity-check step 74. If the amount of stored data is equal to the parameter Y, the storage capacity of the appliance 10 may require immediate transmission. If the stored data amount is not equal to the parameter Y, the character data stored is tested to see if a full message is accumulated in full-message check step 76. In the normal text-to-fax process, this will almost universally result in a "no" decision and the microcontroller 26 will go to the interval timer check step 78. Again, in a manual text-to-fax conversion process the check will almost universally result in an answer of no and a return to start step 80 will be executed. In this way, data words will be continuously received through the RS232 interface 22 until a complete text file or report is uploaded by the data logger 40. At the close of the text file, the data logger 40 will issue an end-of-file command and/or hang up command to the modem it thinks it is addressing. These commands will be interpreted as commands in steps 48, 52, and 54 will result in the microcontroller 26 executing a transmit sequence 82. The start of the transmit sequence is identified by an encircled capital letter C and the transfer to the transfer sequence by means of a command is indicated by a go-to-C step 84. It is connected to the acknowledge and act on selected commands step 54 by a dashed line as it is not triggered by a decision process but is a result of a command from the data logger 40.

The transmit sequence 82 starts by executing a stored dialing command and establishing a connection through the modulator 34, the telephone circuitry 36, and the RJ11 telephone interface 18. All these steps are identified in the establish connection step 86. Once the connection through the external telephone network is established, the microcontroller 26 converts the text information in the memory 32 into fax information such as by rasterizing the lines of characters. This converts the message to a digital fax type graphic data format in a fax conversion step 88. The digital graphic data is then converted into modulated telephone acceptable signal in the modulator 34 and telephone circuitry 36 in the modulation step 90. The information is then transmitted over the phone line in the fax transmission step 92. The call is then terminated in terminate-call step 94 and the message is cleared from the memory in the clear-buffer step 96.

A clock 106 is provided in the appliance 10. The clock creates accurate timing information for the interval timing step 78 and also allows the microcontroller 26 to maintain real time and date information for use in reports and time stamps.

Of course the program memory includes steps for checking for the completion and acknowledgement of fax transmission. Should a fax transmission be aborted prior to completion, the fax will be resent before the buffer 32 is cleared.

Once a message is sent, the call terminated, and the buffer cleared, the transmit sequence 82 terminates and the microcontroller 26 returns to the start condition. The appliance 10 is then ready to accept further text-to-fax modem operations. In the above sequence, the data logger 40 behaves as if it is uploading a text file or report across a standard modem. The appliance 10 mimics the responses of a modem and allows the data logger 40 to continue in this condition throughout the entire process. Text-to-fax conversion takes place entirely in the appliance 10.

A second mode of operation of appliance 10 is a text-to-fax automatic operation mode. Many devices are capable of generating output reports in a text format. A common example is a telephone system controller with a "SMDR" port. Such controllers are used in many businesses, particularly hotels, to accumulate data in ASCII text format on telephone calls. They include the number called, the time of day, the day of the week, accounting codes, and similar information. The data generated is not formed into a file or report and sent to a modem by these controllers but is rather just sent through the port on a continuous or batch basis. These processors are not personal computers and do not have the intelligence of a personal computer. They output information whether something is receiving it or not. These telephone controllers are not unique. A large number of controller appliances , data loggers 40 and the like are capable of making such reports and can therefore be the source of data for the appliance 10. The difference between these devices and those discussed with respect to the manual mode is that here the data logger does not or cannot provide AT commands.

In the automatic text-to-fax modem mode, the sequence of events shown in FIG. 2 is only slightly modified. First, setup operation will normally be performed while the appliance 10 is connected to a personal computer 38. Setup strings are sent to the appliance 10 through the input port and identified by the appliance 10 as setup string in the setup-decision step 46. A complete setup sequence is executed in steps 62-68 for all the setup information necessary. Once this setup is completed and acknowledged, the appliance 10 is disconnected from the personal computer 38 and the input 22 or the input 24 is connected to the data logger 40 or other input device 100 from which data is expected. Data is then received from the device 100 on the input port in the receive data on input port step 42. As virtually all the data will be message characters, the result of the character-decision step 44 is almost universally "yes" and the data is stored in the buffer in step 72. The decision making steps 74, 76 and 78 which are unimportant in the manual mode are very important in the automatic mode. Because a dumb device may simply output data continuously, the buffer memory may easily be filled. Thus, step 74, in which the amount of data accumulated is compared to a parameter Y will often result in a "yes" decision directing the microcontroller 26 to execute the transmit sequence 82. This is identified in FIG. 2 with a go-to-C step 98. Some input devices transmit an identifiable sequence of characters at the end of particular message segments. When it is desirable to transmit such completed messages upon receipt, the sequence of characters is stored as a parameter in step 66 setup sequence and the full message-check step 76 examines data for this sequence of characters. If the sequence is present, the microcontroller 26 causes the appliance 10 to execute the transmit sequence 82. This is identified by a go-to-C step 102 in the drawing. If a full message is not accumulated, the process proceeds to step 78 in which the interval timer count is checked to see if the interval between timed reports has elapsed. The interval is set in the initial setup step 66. If the interval has expired, then the transmit sequence 82 is executed and the report sent. This too is identified in the drawing as a go-to-C step 104.

Thus, in the automatic mode, data characters are received at the RS232 interface 22 or the RS485 interface 24, the data is stored in the buffer, and a series of checks are made. These checks include checking the amount of data currently stored, looking for an end of message string, and checking a report interval timer. If any of these conditions are met, a report is generated, a telephone number is dialed and the report is sent by converting the text information to a fax and transmitting it. If these conditions are not met, the appliance waits for additional data through steps 80 and 42.

The RS485 interface 24 can be connected to a number of external devices. Two input devices 100 are shown in FIG. 1. The appliance 10 has the ability to interrogate external devices over the RS232 interface 22 and the RS485 interface 24 and create reports based on the information received. This structure is illustrated in FIG. 3.

Figure 3:
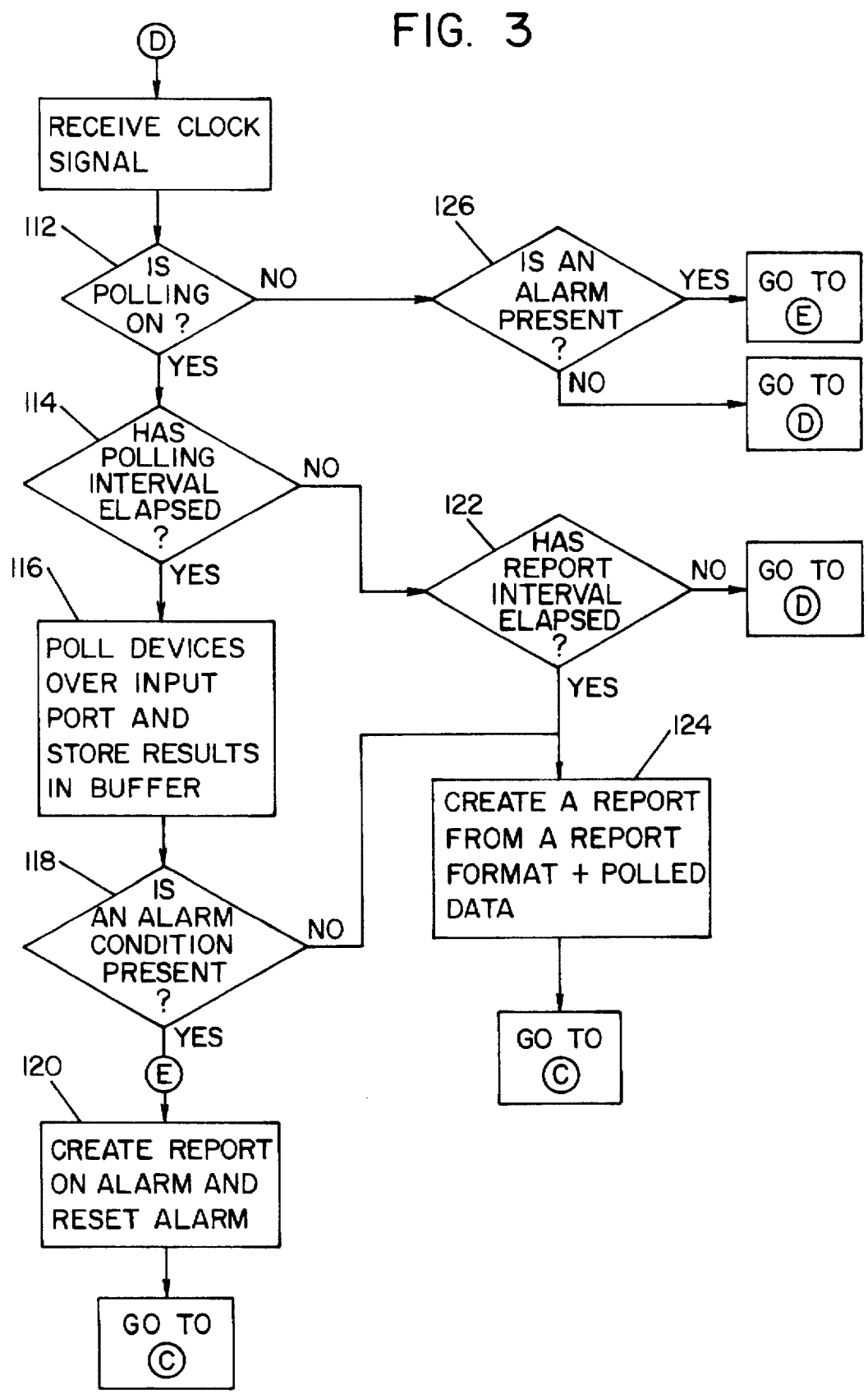
FIG. 3 is a block diagram showing the operation of the appliance of FIG. 1 in the polling mode.

The sequence of steps set forth in FIG. 3 are initiated when microprocessor 26 receives a clock signal. The microprocessor checks to see if polling is on in polling check step 112. If polling is on, the microprocessor determines if the polling interval has elapsed in polling timing step 114. If it has, the microcontroller polls the devices connected to the input interfaces 22, 24 in polling step 116 the information retrieved is stored in the buffer memory 32. A single or multiple sensors can be checked in this polling step. The RS485 interface 24 can address and poll multiple sensing devices 100 and receive reports from these devices sequentially.

The polled data gathered in step 116 is then tested to see if an alarm condition is present in alarm test step 118. An alarm step can be indicated by a specific ASCII code received, by a number received which is outside of a preset range or by other means. If an alarm condition is determined to exist, the appliance 10 formats a report describing the alarm condition in alarm report step 120. The transmit sequence 82 is then called and the report created is transmitted in steps 86 through 96 seen in FIG. 2.

If polling is on and the polling interval has not elapsed, the polling timing step 114 proceeds to a report interval test step 122. If the report interval has elapsed, the microcontroller 26 creates a report from a report format and polled data previously gathered in polling report step 124. The report is then transmitted by means of the transmit sequence 82 seen in FIG. 2. If however, the report interval has not elapsed no action is taken and the microcontroller 26 waits for the next clock signal for input on the input interfaces 22, 24.

If in the polling check step 112 it is determined that polling is not on, the microcontroller 26 checks to see if an alarm condition is present by comparing data values in the buffer memory 32 to alarm condition parameters established in the setup procedure. This test is carried out in the alarm test step 126. If an alarm is present, alarm reporting step 120 is executed, a report created, and transmitted by the transmit sequence 82. If an alarm is not present, the microcontroller 26 waits for the next clock signal for input.

It can be seen in FIG. 3 that upon each clock signal, the appliance 10 checks to determine if polling is on and checks to determine if an alarm condition exists. If polling is on, polling and reporting are performed at preset intervals. The frequency of clock signals can be set so that alarms are reported promptly. Polling and reporting intervals can be set as appropriate for virtually any conditions.

The sequences of FIGS. 2 and 3 can be used independently of one another or can be both active at the same time. The sequence of FIG. 2 is initiated by the presence of input at the input interface which is independent of starting the sequence of FIG. 3 by means of clock pulses.

The invention has been described with reference to a preferred embodiment. Obviously, modifications and alterations will occur to others upon the reading and understanding of the specification and it is intended to include such modifications and alterations insofar as they come within the scope of the appended claims or the equivalents thereof.

Having thus described the invention, it is claimed:

1. A self-contained communications appliance comprising:

at least one data receiving port accepting first digital signals representing characters, said first digital signals conforming to a known standard for representing characters;

a microcontroller accepting said first digital signals from said receiving port, said microcontroller adapted to discriminate between modem commands and non-modem commands in said first digital signals, to selectively bypass conversion of said first digital signals and to act as a standard data accumulator until a predetermined event occurs, said predetermined event including an event consisting of the accumulation of a predetermined amount of data, the passage of a predetermined amount of time, the detection of an alarm condition or the detection of the completion of received data through said receiving port;

buffer memory adapted to selectively receive non-modem commands from said microcontroller;

program memory providing instructions to said microcontroller to selectively accumulate said non-modem commands in said buffer memory and selectively convert groups of said non-modem commands into second digital signals representing graphical information, said converting of said non-modem commands occurring after said predetermined event occurs;

configuration memory adapted to hold at least one phone number and document format information, said microcontroller adapted to cause said appliance to place at least one call to one of said at least one phone number after said predetermined event occurs;

a modulator receiving said second digital signals and converting said second digital signals to modulated signals conforming to a known standard for transmitting fax information over public telephone networks after aid predetermined event occurs; and an output port receiving said modulated signals from said modulator and applying said signals to a telephone network;

said microcontroller providing signals to said data receiving port acknowledging receipt of said modem commands and said non-modem commands with signals mimicking data modem responses indicating that data has been received and dispatched.

2. The communications appliance of claim 1 wherein said data receiving port comprises an RS232 interface and an RS485 interface.

3. The communications appliance of claim 1, wherein said microcontroller selectively bypasses conversion of said first digital signals and acts as a standard modem.

4. The communications appliance as defined in claim 1, wherein said microcontroller provides signals to said data receiving port mimicking data modem responses that a phone number has been dialed and a connection has been made.

5. A self-contained communications appliance comprising:

- at least one data receiving port accepting first digital signals representing characters, aid first digital signals conforming to a known standard for representing characters;
- a microcontroller accepting said first digital signals from said receiving port, said microcontroller adapted to discriminate between modem commands and no-modem commands in said first digital signals, to selectively bypass conversion of said first digital signals and to act as a standard data accumulator until a predetermined event occurs, said predetermined event including an event consisting of the accumulation of a predetermined amount of data, the passage of a predetermined amount of time, the detection of an alarm condition or the detection of the completion of received data through said receiving port;
- buffer memory adapted to selectively receive non-modem commands from said microcontroller;
- program memory providing instructions to said microcontroller to selectively accumulate said non-modem commands in said buffer memory and selectively convert groups of said non-modem commands into second digital signals representing graphical information, said converting of said non-modem commands occurring after said predetermined event occurs;
- configuration memory adapted to hold at least one phone number and document format information, said microcontroller adapted to cause said appliance to place at least one call to one of said at least one phone number after said predetermined event occurs;
- a modulator receiving said second digital signals and converting said second digital signals to modulated signals conforming to a known standard for transmitting fax information over public telephone networks after said predetermined event occurs;
- an output port receiving said modulated signals from said modulator and applying said signals to a telephone network;
- said document format information including at least one plain text description of at least one alarm condition, and said microcontroller selecting from at least one said plain text description in response to specific alarm conditions and including said selected plain text description in said fax message; and,
- said appliance sending a polling signal through said data receiving port causing devices connected to said data receiving port to selectively send said first digital signals.

6. A method of creating fax compatible signals comprising the steps of:

- providing a self-contained communications appliance comprising a data receiving port a microcontroller, a buffer memory, a program memory, a modulator and an output port contained in a housing;
- connecting said data receiving port to a source of alphanumeric character data and modem commands;
- discriminating between character data and commands;
- acknowledging commands which require acknowledgement;
- interpreting the received commands and storing dialing information and document format information for later use;
- accumulating said character data in said buffer memory until a predetermined event occurs, said predetermined event including an event selected from the group consisting of detection of a complete message accumulation, detection of a predetermined amount of accumulated data, the passage of a predetermined amount of time or the detection of an alarm condition;
- executing stored dialing commands and establishing a telephone network connection through said output port;
- converting said accumulated character data into digital graphic data in said microcontroller;
- converting said digital graphic data into a modulated signal in said modulator;
- supplying said modulated signal to said output port in a form conforming to known facsimile transmission standards; and,
- polling said at least one source of data and obtaining data therefrom and storing said data in a predetermined report form.

7. The method as defined in claim 6, including a step of sending an alarm message to said output port upon said detection of said alarm condition.

8. The method as defined in claim 7, including a step of including said alarm message with said converted accumulated character data.

9. The method as defined in claim 7, including a step of executing a predetermined dialing command to establish a telephone network connection upon detection of said alarm condition and sending said alarm message to said output port.

10. The method of claim 6 wherein said at least one source of data is polled at first specific intervals and reports are generated and transmitted at second specific intervals.

11. The method of claim 6 wherein said data obtained in said polling step is compared to stored parameters indicative of an alarm condition and a predetermined report is generated and transmitted if said alarm condition exists.

12. A method of creating fax compatible signals comprising the steps of:

- providing a self-contained communications appliance comprising a data receiving port, a microcontroller, a memory, a modulator, and an output port contained in a housing;
- connecting said data receiving port to at least one source of data;
- discriminating between character data and modem commands;
- acknowledging commands which require acknowledgement;
- interpreting the received commands and storing dialing information and the like for later use;

accumulating said character data in said memory;

comparing the amount of character data stored in said memory to a selected maximum stored character data parameter;

comparing the received character data to a selected full message string;

determining the elapsed time from the last report event and comparing the elapsed time to a selected interval reporting parameter;

executing stored dialing commands and establishing a telephone network connection through said output port after determining the completion of said selected time interval, the receipt of said full message string or the obtaining of said maximum stored character data parameter;

converting said accumulated character data into digital graphic data in said microcontroller;

converting said digital graphic data into a modulated signal in said modulator;

supplying said modulated signal to said output port in a form conforming to known facsimile transmission standards; and, polling said at least one source of data at first specific intervals and generating and transmitting reports at second specific intervals.

13. The method of claim 12 wherein said data obtained in said polling step is compared to stored parameters indicative of an alarm condition and a predetermined report is generated and transmitted if said alarm condition exists.

* * * * *